No. 845,567. PATENTED FEB. 26, 1907.
J. H. NICKS.
CULTIVATOR ATTACHMENT.
APPLICATION FILED OCT. 31, 1906.
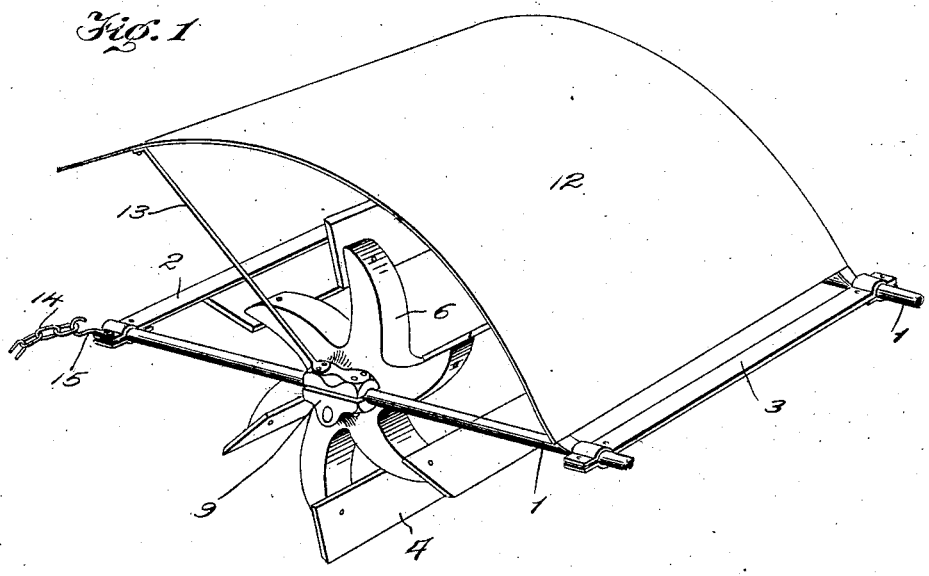
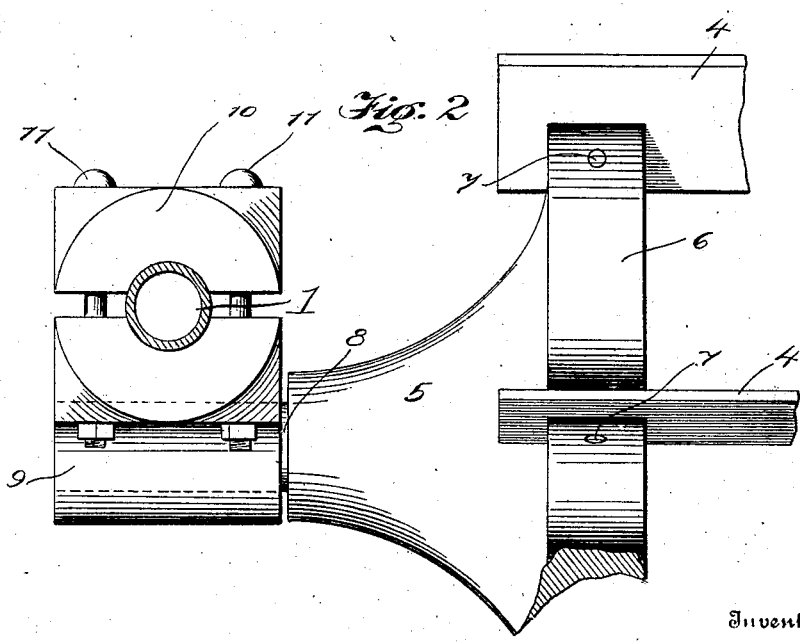
Witnesses
Inventor
John H. Nicks
By Victor J. Evans
Attorney

UNITED STATES PATENT OFFICE.

JOHN H. NICKS, OF HALESBORO, TEXAS.

CULTIVATOR ATTACHMENT.

No. 845,567.  Specification of Letters Patent.  Patented Feb. 26, 1907.

Application filed October 31, 1906. Serial No. 341,478.

*To all whom it may concern:*

Be it known that I, JOHN H. NICKS, a citizen of the United States of America, residing at Halesboro, in the county of Red River and State of Texas, have invented new and useful Improvements in Cultivator Attachments, of which the following is a specification.

This invention relates to cultivator attachments; and one of the principal objects of the same is to provide a stalk-cutter which may be quickly attached to a cultivator-frame in place of the cultivator-teeth and which will operate efficiently for cutting the stalks or for chopping out cotton in making cotton-stands.

Another object of my invention is to provide a simple stalk-cutting attachment for cultivator-frames and to provide means for quickly attaching and detaching the stalk-cutter from the cultivator-frame.

These and other objects may be attained by means of the construction illustrated in the accompanying drawings, in which—

Figure 1 is a perspective view of a stalk-cutter attachment made in accordance with my invention and shown secured to the parellel beams of an ordinary cultivator. Fig. 2 is an enlarged detail view of the hub of the cutter and the clamping devices for holding the same in adjusted position upon the parallel beams of the cultivator.

Referring to the drawing for a more particular description of my invention, the numerals 1 designate the parallel beams of the cultivator, and to these beams my attachment may be readily connected. My attachment consists of a front cross-bar 2 and a rear cross-bar 3, secured to the beams 1. The cutter-blades 4 are secured at their opposite ends to hubs 5, provided with radial arms 6, to which the blades are bolted, as at 7. The hub 5 is provided with a stub-axle 8, which is journaled in a clamp-plate 9, adapted to be fitted to the under side of the beams 1. An upper clamp-plate 10 is connected by bolts 11 to the casting 9 to hold the rotary cutter at the required position upon the beams 1. A shield or housing 12 is supported above the rotary cutter and is provided with braces 13, supported upon the casting 10 of the clamp. Chains 14, connected at the ends of the cross-bar 2 by means of a hook 15, are designed to extend to the lever of the cultivator in order that the cutter-frame may be raised and lowered by the same lever that is utilized for raising and lowering the cultivator-teeth.

From the foregoing it will be obvious that my cutter attachment may be readily connected to any parallel-beam cultivator-frame by removing the cultivator-teeth and placing the attachment between the beams and securing it in place in the manner described, the chains 14 being connected to the lever for raising and lowering the cutter attachment.

My stalk-cutter may be used to advantage in chopping cotton.

Having thus described the invention, what I claim is—

1. A cultivator attachment comprising a rotary cutter, clamps for securing said cutter in place between the parallel beams of a cultivator-frame, the cutter being journaled in the lower members of said clamps, hooks secured to said cultivator attachment and chains connected to said hooks, for the purpose described.

2. A cultivator attachment comprising front and rear cross-bars designed to be connected to the parallel beams of a cultivator-frame, hooks on the front cross-bar, chains connected to said hooks for the purpose described, a rotary cutter comprising end hubs provided with radial arms, cutter-blades secured to said arms, clamps for connecting the cutter to the parallel beams, said hubs being journaled in the lower members of said clamps, substantially as described.

In testimony whereof I affix my signature in presence of two witnesses.

JOHN H. NICKS.

Witnesses:
 W. S. GRIFFIN,
 B. L. MCALISTER.